United States Patent
Kim et al.

(10) Patent No.: US 7,218,467 B2
(45) Date of Patent: May 15, 2007

(54) METHOD AND APPARATUS FOR OPTIMIZING WRITE PROPERTIES OF MAGNETIC HEAD AND DEFINING MAGNETIC HEAD

(75) Inventors: Jong-yoon Kim, Yongin-si (KR); Jae-deog Cho, Suwon-si (KR); Seong-hwan Yu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 72 days.

(21) Appl. No.: 10/942,772

(22) Filed: Sep. 17, 2004

(65) Prior Publication Data

US 2005/0057835 A1 Mar. 17, 2005

(30) Foreign Application Priority Data

Sep. 17, 2003 (KR) .................. 10-2003-0064568

(51) Int. Cl.
*G11B 5/09* (2006.01)
(52) U.S. Cl. ........................................ 360/46
(58) Field of Classification Search ............... 360/46, 360/31, 68, 126; 347/258; 369/13.24
See application file for complete search history.

(56) References Cited

U.S. PATENT DOCUMENTS

| | | | | |
|---|---|---|---|---|
| 5,347,297 | A * | 9/1994 | Gage | 347/258 |
| 5,959,942 | A * | 9/1999 | Taguchi et al. | 369/13.24 |
| 6,078,454 | A | 6/2000 | Takahashi et al. | |
| 6,111,406 | A | 8/2000 | Garfunkel et al. | |
| 6,493,183 | B1 * | 12/2002 | Kasiraj et al. | 360/126 |
| 6,975,475 | B2 * | 12/2005 | Lee et al. | 360/68 |
| 6,999,256 | B2 * | 2/2006 | Kim et al. | 360/31 |
| 2004/0042105 | A1 * | 3/2004 | Cho | 360/31 |
| 2004/0174627 | A1 * | 9/2004 | Kim et al. | 360/31 |
| 2005/0073774 | A1 * | 4/2005 | Wang et al. | 360/126 |

FOREIGN PATENT DOCUMENTS

| | | |
|---|---|---|
| JP | 11-39839 | 2/1999 |
| JP | 11-250409 | 9/1999 |
| JP | 2002-222703 | 8/2002 |

* cited by examiner

*Primary Examiner*—Fred F. Tzeng
(74) *Attorney, Agent, or Firm*—Staas & Halsey LLP

(57) ABSTRACT

A method and apparatus for optimizing write properties of a magnetic head capable of performing read/write functions on a medium including defining the magnetic head as a normal head, a low temperature weak write (WW) head, or a high temperature WW head, and optimizing the write properties using optimal over shoot control (OSC) and write current (WC) according to the defined kind of magnetic head. Accordingly, the magnetic head in a hard disk drive (HDD) can be defined as the normal head, the low temperature WW head, or the high temperature WW head. Since the method uses the optimal OSC and WC values, according to the defined kind of magnetic head, in consideration of writability of the magnetic head and environmental temperature, low temperature or high temperature WW problems are avoided.

30 Claims, 5 Drawing Sheets

METHOD AND APPARATUS FOR OPTIMIZING WRITE PROPERTIES OF MAGNETIC HEAD AND DEFINING MAGNETIC HEAD

CROSS-REFERENCE TO RELATED APPLICATIONS

This application claims the priority benefit of Korean Patent Application No. 2003-64568, filed on Sep. 17, 2003, in the Korean Intellectual Property Office, the disclosure of which is incorporated herein in its entirety by reference.

BACKGROUND OF THE INVENTION

1. Field of the Invention

The present invention relates to a hard disk drive (HDD), and more particularly, to a method and apparatus for optimizing write properties of a magnetic head in consideration of writability of each magnetic head in an HDD, and a method and apparatus for defining the magnetic head.

2. Description of the Related Art

A hard disk drive (HDD) is a device that reads and writes data from and to a disk by way of a magnetic head. The disk is rotatably mounted on a spindle motor, and information is accessed by the magnetic head, namely, a read/write head, mounted on an actuator arm that is rotated by a voice coil motor. The voice coil motor is excited by current to rotate an actuator and move the read/write head. The read/write head detects the occurrence of a magnetic change on a surface of the disk and reads the information recorded on the surface of the disk. To write information on a data track, current is supplied to the read/write head, creating a magnetic field, thereby magnetizing the surface of the disk.

The performance of the HDD under certain environmental conditions is critical in the reliability of the HDD. In particular, the performance of the HDD under certain temperature and humidity conditions is closely related to writability hindrances, such as adjacent track erase (ATE) or weak write (WW) occurrences.

Here, a phenomenon where data written on tracks adjacent to a target track is erased due to write current provided to the magnetic head is referred to as the ATE.

The writability is critical for the HDD, and such write performance can be affected by the environment surrounding the HDD.

In general, at a low temperature, coercivity of a CoCrPt-based magnetic layer of a medium, e.g., a hard disk, increases such that write properties deteriorate, as compared to the operation of the HDD at normal temperatures. Consequently, the HDD cannot correctly write data, and the HDD also suffers deterioration of overwrite properties, thereby failing to correctly overwrite previous data. In contrast, at a high temperature, coercivity decreases such that the HDD is forced to execute too strong of a write current on a same write field. Consequently, the HDD suffers track encroachment (TE) on adjacent tracks, or ATE.

At a high temperature, the ATE properties of the magnetic head deteriorate due to a decrease in the coercivity of the magnetic layer of the medium and in flying height (FH). At a low temperature, however, the ATE properties deteriorate due to an increase in the coercivity of the medium.

As the capacity of an HDD has increased recently, the size of a read/write sensor for the magnetic head has also been reduced, along with the FH. Accordingly, when the physical size of the magnetic head is reduced, the HDD becomes more susceptible to an ATE phenomenon, where data on adjacent tracks is erased due to the strength of the write current provided to the magnetic head.

Here, the occurrence of WW is noticed mostly with low temperatures, i.e., low temperature WW, where magnetic coercivity of a medium increases in the low temperatures such that write properties deteriorate and wrong information is recorded to the disk.

There have been recent attempts to compensate for or correct interference between tracks, i.e., track erasure (TE) or ATE, caused by a decrease in the coercivity of the magnetic layer of the medium at a high temperature, by reducing an over shoot control (OSC) or write current (WC) value. In this case, high temperature WW, which is caused by the OSC or WC being too low in comparison with the property of the magnetic head, may occur.

Figure 1:
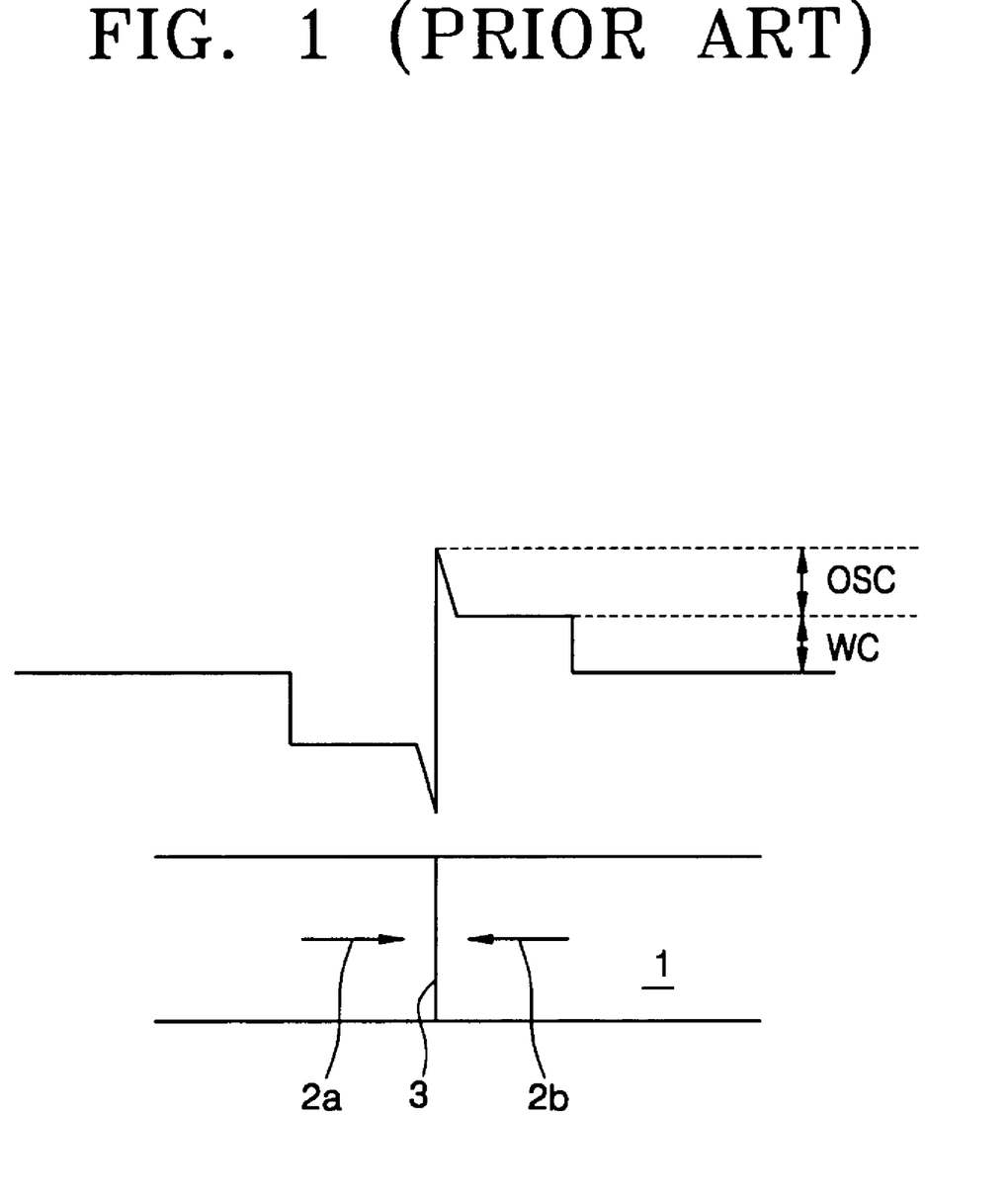
FIG. 1 illustrates a waveform of write current.

Here, referring to FIG. 1, illustrating a write current waveform, the write current rises sharply at a turning point from data 2a written on a magnetic layer 1 of a medium to data 2b. A dc component of the write current is referred to as the WC value, and a rising component is referred to as the OSC value. The WC is used to keep the intensity of a magnetic field around the coercivity level of the magnetic layer. The OSC is used to trigger a raising of the intensity of the magnetic field in a recording position beyond the coercivity level.

Most HDDs currently employ the technology that measures a die temperature using a temperature sensor, embedded in a preamplifier, to know an environmental temperature of the HDD, such that, at a low temperature, the OSC and/or WC values may be increased correspondingly to the coercivity of the magnetic layer, which has been enhanced to improve writability, and at a high temperature, the OSC and/or WC values may be decreased correspondingly to the coercivity of the magnetic layer, which has been reduced to have write properties suited to the environmental temperature.

That is, the HDD currently controls the WC and/or OSC through a measuring of the temperature of the HDD, i.e., practically, measuring the temperature of the terminal preamplifier, such that higher WC and OSC values are used at the low temperature to deal with the increase of the coercivity of the magnetic layer and such that the lower WC and OSC values are used at the high temperature to deal with the decrease of the coercivity of the magnetic layer.

However, since the magnetic head and the preamplifier have wide property distributions, the overwrite or writability properties are still not sufficient when the OSC and WC values are increased or decreased to some degree, based only on the detected temperature, as in the conventional art. As a result, low or high temperature WW problems still occur, thereby leading to bit errors or corruption in recorded data.

SUMMARY OF THE INVENTION

Embodiments of the present invention provide a method and apparatus for optimizing write properties of a magnetic head and defining the magnetic head, considering writability of each magnetic head in a hard disk drive (HDD) and utilizing optimal over shoot control (OSC) and write current (WC) values according to characteristics of the magnetic head, to solve weak write (WW) problems.

Additional aspects and/or advantages of the invention will be set forth in part in the description which follows and, in part, will be obvious from the description, or may be learned by practice of the invention.

To achieve the above and/or additional aspects and advantages, embodiments of the present invention may include a method of optimizing write properties of a magnetic head capable of performing read/write functions on a medium, the method including defining the magnetic head as a defined normal head, a defined low temperature weak write head, or a defined high temperature weak write head, and optimizing the write properties of the magnetic head using optimal over shoot control and write current according to the defined status of the magnetic head and an environmental temperature.

The operation of defining the magnetic head may include performing an adjacent track write operation "M" number of times on a plurality of zones of a track adjacent to a target track of the medium, and measuring a first over shoot control with an optimal bit error rate on the target track, and comparing an average value of multiple first over shoot controls of the plurality of zones with a first criterion value, and judging whether the magnetic head corresponds to a low temperature weak write head, and/or performing the adjacent track write operation "N" number of times, where "N" is greater than "M", on the plurality of zones of the track adjacent to the target track of the medium, and measuring a second over shoot control with an optimal bit error rate on the target track, and comparing an average value of multiple second over shoot controls of the plurality of zones with a second criterion value, and judging whether the magnetic head corresponds to a high temperature weak write head.

The operation of judging whether the magnetic head corresponds to the low temperature weak write head may include judging that the magnetic head corresponds to the low temperature weak write head when the average value of the multiple first over shoot controls is greater than the first criterion value, and judging that the magnetic head corresponds to a normal head when the average value of the multiple first over shoot controls is equal to or less than the first criterion value. The first criterion value may be greater than the second criterion value.

Further, the operation of judging whether the magnetic head corresponds to the high temperature weak write head may include judging that the magnetic head corresponds to the high temperature weak write head when the average value of the multiple second over shoot controls is greater than the second criterion value, and judging that the magnetic head corresponds to a normal head when the average value of the multiple second over shoot controls is equal to or less than the second criterion value.

The adjacent track write operation may also be performed in all zones of both adjacent tracks, adjacent to the target track, and both of the average values of the multiple first and second over shoot controls are average values for all the zones.

In addition, the operation of optimizing the write properties can be performed at a normal temperature such that the defined high temperature weak write head, the defined low temperature weak write head, and the defined normal head utilize the first over shoot control, and/or utilize a write current measured with an optimal bit error rate in a state where the adjacent track write operation has not been performed.

The operation of optimizing the write properties may be performed at a low temperature such that the defined low temperature weak write head utilizes a maximum over shoot control, and the defined normal head and the defined high temperature weak write head utilize an over shoot control with an optimal bit error rate in a state where the adjacent track write operation has not been performed, and/or the defined low temperature weak write head utilizes a write current, which is greater than a write current used by the defined normal head, and the defined high temperature weak write head and the defined normal head utilize a write current, which is less than a write current used by the defined low temperature weak write head.

The operation of optimizing the write properties may be performed at a high temperature such that the defined high temperature weak write head utilizes an over shoot control greater than the second over shoot control by a predetermined level "α", and the defined low temperature weak write head and the defined normal head utilize the second over shoot control, and/or the defined normal head and the defined low temperature weak write head utilize a write current, which is less than a write current with the optimal bit error rate in a state where the adjacent track write operation has not been performed, and the defined high temperature weak write head utilizes the write current with the optimal bit error rate in the state where the adjacent write track operation has not been performed.

Further, the operation of optimizing the write properties can be performed at a high temperature such that the defined high temperature weak write head utilizes an over shoot control and write current which are greater than an over-shoot and write current used for the defined normal head. The operation of optimizing the write properties can be performed at a low temperature such that the defined low temperature weak write head utilizes an over shoot control and write current which are greater than an overshoot and write current used for the defined normal head.

To achieve the above and/or additional aspects and advantages, embodiments of the present invention may include a method of defining a magnetic head as a defined normal head, a defined low temperature weak write head, or a defined high temperature weak write head, the method including performing an adjacent track write operation "M" number of times on a plurality of zones of a track adjacent to a target track of a medium, and measuring a first over shoot control with an optimal bit rate on the target track, and comparing an average value of multiple first over shoot controls of the plurality of zones with a first criterion value, and judging whether the magnetic head corresponds to a low temperature weak write head, and/or performing the adjacent track write operation "N" number of times, where "N" is greater than "M", on the plurality of zones of the track adjacent to the target track of the medium, and measuring a second over shoot control with an optimal bit rate on the target track, comparing an average value of multiple second over shoot controls of the plurality of zones with a second criterion, and judging whether the magnetic head corresponds to a high temperature weak write head.

The operation of judging whether the magnetic head corresponds to the low temperature weak write head includes judging that the magnetic head corresponds to the low temperature weak write head when the average value of the multiple first over shoot controls is greater than the first criterion value, and judging that the magnetic head corresponds to a normal head when the average value of the multiple first over shoot controls is equal to or less than the second criterion value.

The operation of judging whether the magnetic head corresponds to the high temperature weak write head includes judging that the magnetic head corresponds to the high temperature weak write head when the average value of the multiple second over shoot controls is greater than the second criterion value, and judging that the magnetic head corresponds to a normal head when the average value of the multiple second over shoot controls is equal to or less than the second criterion value.

To achieve the above and/or additional aspects and advantages, embodiments of the present invention may include a method of operating a drive, with optimized write properties of multiple heads of the drive being capable of performing read/write functions on a medium of the drive, the method including defining a head status of each head, with each head being defined as a defined normal head, a defined low temperature head, or a defined high temperature head, and optimizing the write properties of the multiple heads using the defined head status of the multiple heads and an environmental temperature, and writing information to the medium based on the optimized write properties and a head status definition of a corresponding head, as the defined normal head, the defined low temperature head, or the defined high temperature head.

Further, when a drive environmental temperature is high write properties for the defined normal head and defined low temperature head may be different from write properties of the defined high temperature head, when the drive environmental temperature is low write properties of the defined normal head and defined high temperature head may be different from write properties of the defined low temperature head, and when the drive temperature is normal the drive properties for the defined normal head, the defined high temperature head, and the defined low temperature head may be the same.

To achieve the above and/or additional aspects and advantages, embodiments of the present invention may include a hard disk drive, including a disk for storing information, a head assembly comprising a head to control the addition and/or deletion of information to/from the disk, and an actuator assembly to rotate the head assembly, wherein write properties for controlling the writing of information to the disk, as performed by the head, are optimized according to embodiments of the present invention.

Similarly, to achieve the above and/or additional aspects and advantages, embodiments of the present invention may include a hard disk drive, including a disk for storing information, a head assembly comprising a head to control the addition and/or deletion of information to/from the disk, and an actuator assembly to rotate the head assembly, wherein the head is controlled and data written to the disk according to a defining of the head as a defined normal head, a defined low temperature weak write head, or a defined high temperature weak write head, according to embodiments of the present invention.

Lastly, to achieve the above and/or additional aspects and advantages, embodiments of the present invention may include a hard disk drive, including a disk for storing information, a head assembly comprising a head to control the addition and/or deletion of information to/from the disk, and an actuator assembly to rotate the head assembly, wherein the head is controlled and data written to the disk according to a defining of the head as a defined normal head, a defined low temperature weak write head, or a defined high temperature weak write head, according to embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

A hard disk drive (HDD) includes a plurality of magnetic heads, each corresponding to a read/write surface of a rotating hard disk. Since several hard disks are generally installed on a single rotating shaft in the HDD, several magnetic heads are disposed to correspond to the respective hard disks. Each magnetic head writes or reads information through magnetization, or detection of a magnetic field, on a surface of each corresponding hard disk.

Read/write functions in the HDD are performed by driving a swing arm to move the magnetic head, installed on an end of the swing arm, to a proper position on the rotating disk using a rotational force of a magnetic head assembly, which is rotatably installed on a base.

Figure 2:
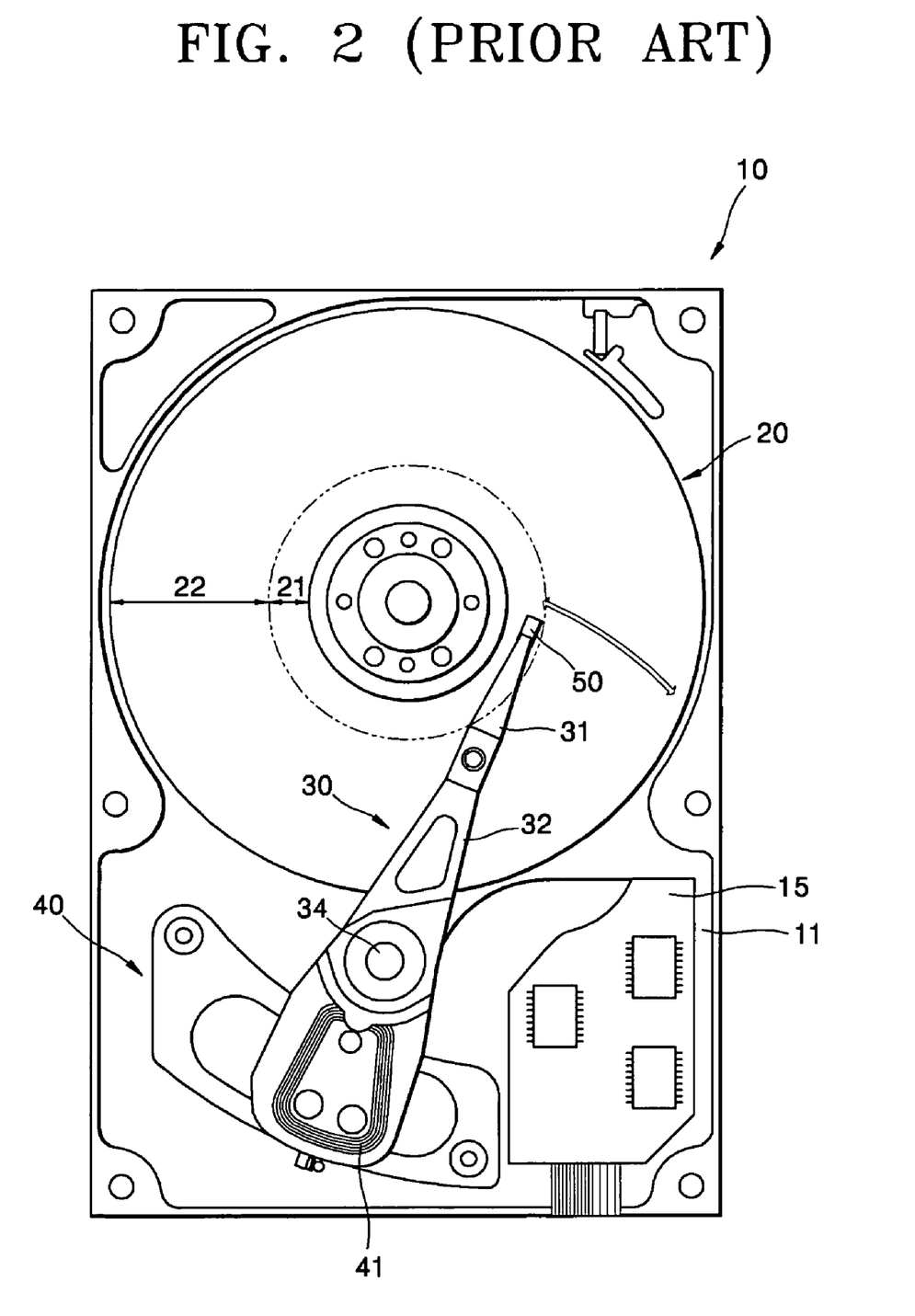
FIG. 2 schematically illustrates elements of a hard disk drive (HDD)

FIG. 2 schematically illustrates an embodiment of the HDD. Referring to FIG. 2, an HDD 10 includes a hard disk 20, on which predetermined information is recorded, and a magnetic head moving unit, which moves a magnetic head slider 50 to a desired track on the hard disk 20 to write and read information. Here, the hard disk 20 may have a recording area 22, where the information is recorded, and a parking area 21, where the magnetic head slider 50 is parked when the hard disk 20 stops rotating.

The hard disk 20 is rotatably installed on a base 11, and is rotated by a spindle motor (not shown).

The magnetic head moving unit includes a magnetic head assembly 30, where the magnetic head slider 50 is mounted, the magnetic head assembly being rotatably installed about a rotating shaft 34 disposed on the base 11, and an actuator 40, which rotates the magnetic head assembly 30 using an electromagnetic force.

The magnetic head assembly 30 includes the shaft 34, a suspension 31, which is installed on a distal end of an actuator arm 32, rotatably coupled to the shaft 34, and the magnetic head slider 50, installed on the suspension 31. Installed on suspension 31 is a magnetic head 70 of the HDD 10, further illustrated in FIG. 3, which writes and reads information to and from the hard disk 20.

The magnetic head slider 50 is biased toward the hard disk 20 by the suspension 31, and flies over the hard disk 20 using aerodynamic pressure generated by the rotation of the hard disk 20 when the hard disk 20 rotates. A flying height (FH), at which the magnetic head slider 50 flies over hard disk 20, is determined by a gram load of the suspension 31 and a lift force produced due to the air flow over the hard disk 20 during the rotation of the hard disk 20.

Here, when the magnetic head slider 50 flies over the hard disk 20 during the rotation of the hard disk 20, a gap between a surface of the hard disk 20 and a read sensor, i.e., a magneto-resistive (MR) head, disposed on a leading end of the magnetic head slider 50 is referred to as the FH. A force exhibited by the suspension 31 is referred to as the gram load.

Figure 3:
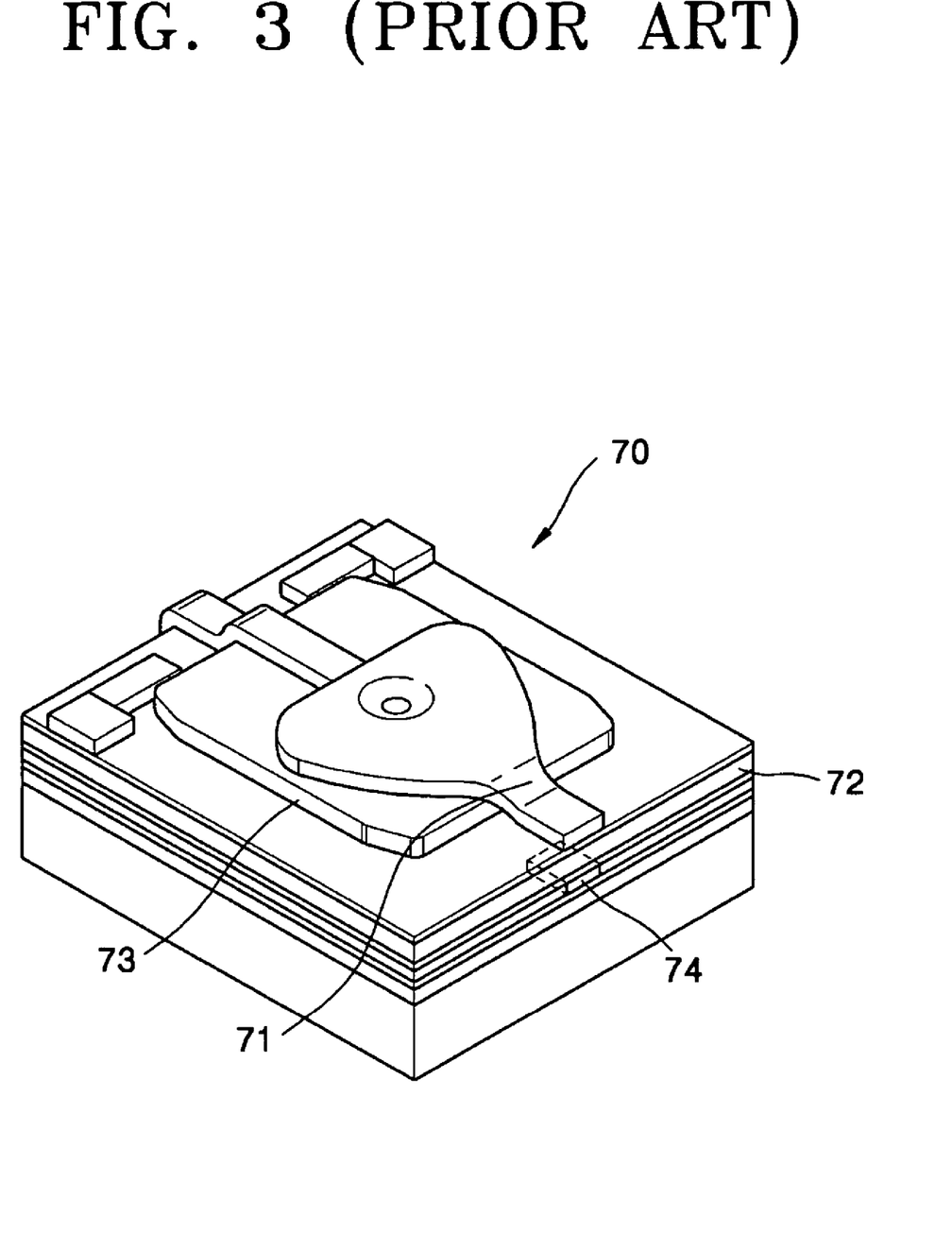
FIG. 3 is a schematic perspective illustration of a magnetic head of the HDD illustrated in FIG. 2.

FIG. 3 schematically illustrates an embodiment of the magnetic head 70, applicable to the HDD 10 of FIG. 2. As illustrated in FIG. 3, the magnetic head 70 includes an MR head 74 for reading data and an inductive write head for writing data. The MR head 74 senses and reads a magnetic signal written on the hard disk 20. The inductive write head includes a top pole 71 and a bottom pole 72, which form magnetic flux leaking to the hard disk 20, and a write coil 73, which creates a magnetic field when current is supplied. The inductive write head functions to write a desired magnetic signal to the hard disk 20.

A plurality of heads, like head 70, can be disposed with corresponding surfaces of respective hard disks 20.

Still referring to FIG. 2, the actuator 40 includes a magnet (not shown) and a voice coil 41, both of which are well known. If current is applied to the voice coil 41, the actuator 40 moves each of the magnetic heads to a desired track on each of the hard disks 20.

The spindle motor, the voice coil 41, and the corresponding magnetic heads are electrically connected to an electronic circuit of a printed circuit board assembly 15. The electronic circuit includes a preamplifier, a read/write channel circuit, and a servo controller. The electronic circuit is electrically connected to the magnetic heads that respectively sense the magnetic fields of the hard disks.

The magnetic head 70 generates a read signal corresponding to a magnetic field of the hard disk. The preamplifier amplifies the read signal, which is then sent to the read/write channel circuit. The read/write channel circuit modulates the received analog signal into a digital signal, and performs a signal processing to convert received user data into a write current, so as to write the received user data to the hard disk 20. The servo controller controls the entire HDD.

During manufacture, after the above referenced HDD is assembled, processes for verifying and optimizing the HDD are then performed.

These HDD processes include a process of optimizing operations of the assembled HDD, and a process of verifying read/write performances of the HDD.

The process of optimizing the operations of the HDD includes various calibrating and parameter optimizing processes, such as a servo calibrating process, a channel optimizing process, and a printed circuit board assembly (PCBA) checking process.

The servo calibrating process optimizes parameters for mechanically and electrically controlling a position of a read/write head, namely, an MR head. Here, the parameters to be optimized include an MR skew of an MR head, a KT value, and so on. The KT value represents the magnitude of acceleration of the MR head according to a rotational force of the magnetic head.

The channel optimizing process optimizes read/write parameters for performing normal read/write functions on the MR head. For example, the read/write parameters include read current and write current.

The PCBA checking process detects whether a PCBA performs required mechanical/electrical functions, and checks whether a circuit system functions correctly. A plurality of circuits, including a read/write integrated circuit (RW IC) for performing read/write functions, a controller, a combo IC for controlling a motor, and so on are installed on a printed circuit board of the PCBA.

The process of optimizing the operations of the HDD includes the mechanical/electrical calibrating process for various parts making up the HDD and the various parameter optimizing processes.

A plurality of magnetic heads are disposed within the HDD in such a manner as to correspond to read/write surfaces of hard disks. The process of verifying the read/write performances is performed on the respective magnetic heads. For example, if "N" number of magnetic heads are disposed within the HDD, the process is performed on magnetic heads ranging from a first magnetic head to an "$N^{th}$" magnetic head. The read/write performances of the respective magnetic heads are verified by a read/write performance test. The read/write performance verifying process is carried out by reading an off-track, changing various write patterns, etc.

Embodiments of the present invention uses a writabilty verifying process among the HDD processes to define a magnetic head as being in a normal state, i.e., a normal head, in a high temperature weak write WW state, i.e., a high temperature WW head, and a low temperature WW state, i.e., a low temperature WW head, and optimizes the magnetic head using the optimal over shoot control (OSC) and write current (WC) at a high or low temperature according to the characteristics of the defined magnetic head state.

Embodiments of the present invention include the process of optimizing the operations of the HDD. A corresponding process of verifying the read/write performances of the HDD is performed using a first OSC value, which is obtained to define the low temperature WW head.

According to embodiments of the present invention, based on the fact that a potential WW head, i.e., a head in having the WW status, has a weaker fringe field than a normal head, adjacent track write (ATW) operation is performed on both tracks adjacent to a target track, an OSC value is measured when an established bit error rate (BER) value is the best, i.e., optimal, and the magnetic head is defined as being a low temperature WW head or a high temperature WW head according to the measured OSC value.

The BER is the percentage of bits that have errors relative to the certain number of bits contained in a signal read by the magnetic head.

Figure 4:
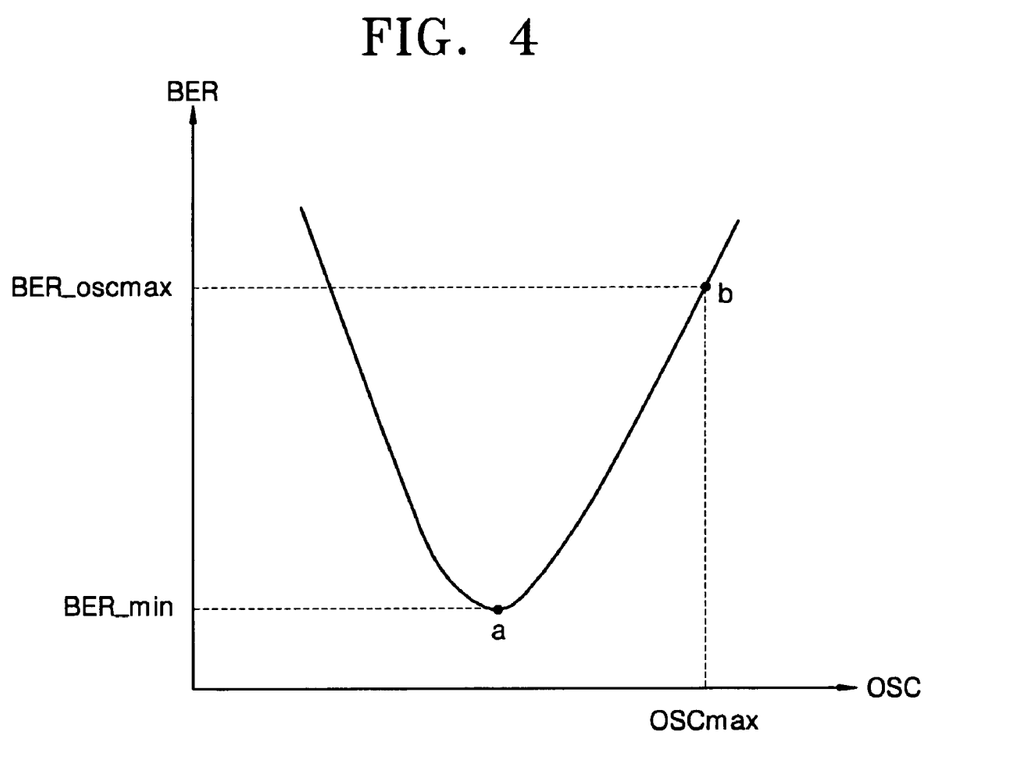
FIG. 4 graphically illustrates a relationship between over shoot control (OSC) and bit error rate (BER) values.

FIG. 4 illustrates a relationship between the OSC and BER, the illustrated graph has a substantial V-shape with a substantial lowest BER (BER_min) value as a trough "a". The graph will now be interpreted. As an example, when the OSC value is low, the BER value increases due to a low magnetic field. When the OSC value is high, a thermal pole tip protrusion (TPTP) becomes larger, and accordingly, the BER value increases. Reference character "b" in FIG. 4 represents a BER (BER_oscmax) value at a maximum OSC (OSCmax) value within an effective range.

Here, the HDD currently has a magnetic head structure in which a pole made of permalloy is embedded in a non-metallic slider. Accordingly, if current flows through the coil, arranged on the magnetic head, during a write operation, heat is produced and the extremities of the metallic pole expand and protrude due to the differences in thermal expansion coefficients between the metallic material and the non-metallic material. The protrusion is referred to as the TPTP. A margin of Hard Disk Interface (HDI) between the magnetic head and the hard disk is reduced due to the TPTP, resulting in a decrease in the FH of the magnetic head. Accordingly, an excessively large TPTP may cause a conflict between the magnetic head and the hard disk, leading to damage to the pole, thermal asperity, signal modulation, etc.

Therefore, if the OSC value is high, the TPTP becomes large and the BER value increases.

Figure 5:
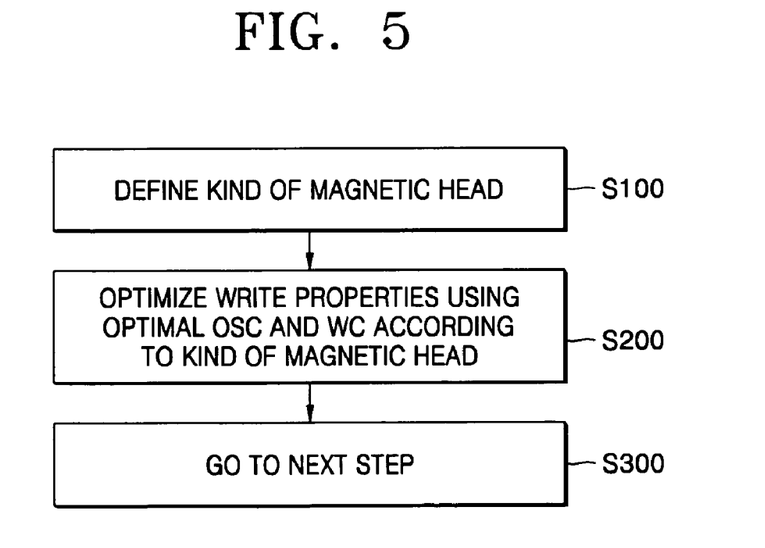
FIG. 5 is a schematic flow chart of a method of optimizing write properties of a magnetic head, according to an embodiment of the present invention.
Figure 6:
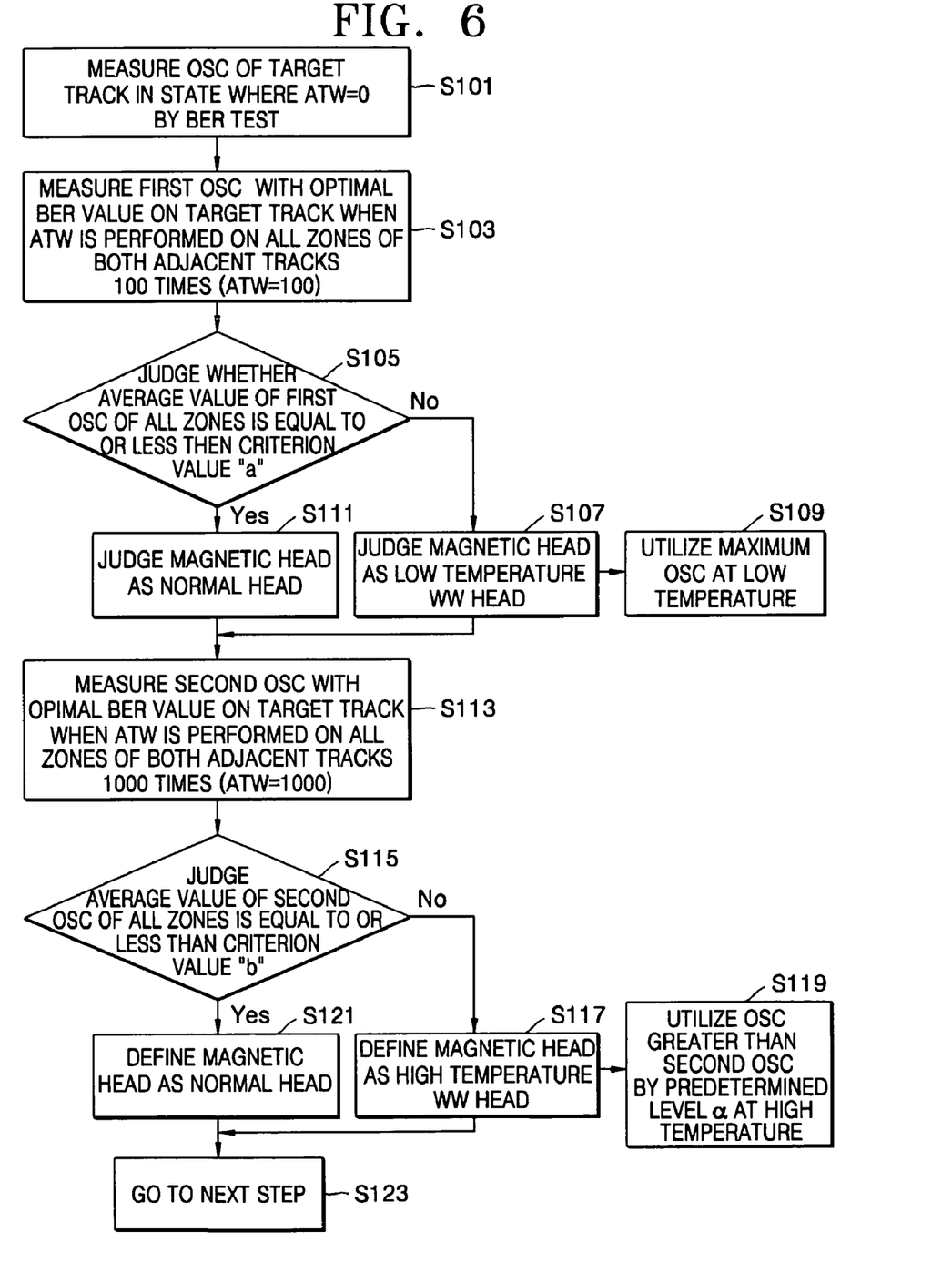
FIG. 6 is a flow chart illustrating a method of defining a magnetic head, according to an embodiment of the present invention, as applied to the method illustrated in FIG. 5.

FIG. 5 is a schematic flow chart illustrating a method of optimizing the write properties of the magnetic head according to embodiments of the present invention, and FIG. 6 is a flow chart illustrating a method of defining the magnetic head according to an embodiment of the present invention, as applied to the method of FIG. 5.

Referring to FIG. 5, in this embodiment, the method of optimizing the write properties of the magnetic head, which can perform read/write functions on the media, e.g., the hard disk of the HDD, includes defining the status of the magnetic head as a normal head, a low temperature WW head, or a high temperature WW head, in operation S100, and optimizing the write properties of the objective magnetic head using optimal OSC and WC values according to the defined status of the magnetic head, in operation S200.

Verification of the optimized write properties of the magnetic head, according to embodiments of the present invention are performed at a normal temperature.

When embodiments of the present invention are used to optimize write properties of a plurality of magnetic heads, included in a plurality of HDDs, and after definition and write property optimization of one magnetic head has been completed, the process proceeds to the next operation, where definition and write property optimization are performed on a next magnetic head, in operation S300.

As will be described later, in operation S200, a magnetic head defined as the high temperature WW head utilizes OSC and WC values greater than those of the normal head at a high temperature. Further, in operation S200, a magnetic head defined as the low temperature WW head utilizes OSC and WC values greater than those of the normal head at a low temperature.

Referring to FIG. 6, the status of the magnetic head may be defined through the following operations.

First, in operation S101, an on track OSC value of the target track, in a state where the ATW operation has never been performed by a BER test, is measured. At this time, the measured OSC value becomes an established optimal OSC value with the best BER value, with respect to the target track, when the ATW operation has not been performed (ATW=0).

To be more specific, data is recorded on the target track a predetermined number of times, e.g., 10 times, under given OSC conditions. The target track is then read a predetermined number of times, e.g., 600 times, to measure the BER value. This process is repeated according to varying OSC value conditions to detect the OSC value with an optimal BER, that is, the lowest BER. At this time, the OSC value is within an allowable range, between minimum and maximum OSC values in an HDD system. The OSC value is divided into several levels, to tens of levels, and then is applied to the practical system. Here, the minimum and maximum OSC values and the number of levels dividing the OSC value may vary depending on manufacturers of the HDD system.

Here, at a low temperature, the normal head utilizes the OSC value with the optimal BER when the ATW is 0. As will be described later, a magnetic head defined as the low temperature WW head utilizes the maximum OSC value, rather than the OSC value with the optimal BER value.

Next, in operation S103, the ATW operation is performed on all the zones of both adjacent tracks M times, e.g., 100 times. Then, an OSC value with an optimal BER value on the target track is measured. Here, the measured OSC value is referred to as a first OSC value. The first OSC value is the OSC value with the optimal BER value when the ATW is performed M times.

To be more specific, in operation S103, data is recorded on the tracks adjacent to the target track M times, e.g., 100 times, under given OSC conditions, and then, the target track is read a predetermined number of times, e.g., 600 times, to measure the BER value. The process is repeated according to varying OSC conditions to detect the first OSC value with the optimal BER value, that is, the lowest BER value.

Next, in operation S105, an average value of first OSC values of all the zones is compared with a criterion value "a". Here, the criterion value "a" may vary according to the range of OSC and manufacturing conditions of the HDD. For example, the criterion value "a" may be an approximately intermediate value in the OSC range.

If the average value of the first OSC values of all the zones is greater than the criterion value "a", it means that the write fringe field is weak. Accordingly, if the average value of the first OSC values is judged to be greater than the criterion value "a" in operation 105, the magnetic head is then defined as the low temperature WW head, in operation S107. In operation S109, the low temperature WW head utilizes OSC and WC values greater than those of the normal head at a low temperature. In an embodiment of the present invention, the low temperature WW head utilizes the maximum OSC value at the low temperature.

If the average value of the first OSC values is judged to be equal to or less than the criterion value "a," in operation S105, the magnetic head is defined to be a normal head, in operation S111.

Next, in operation S113, the ATW operation is performed on all the zones of both adjacent tracks N times (N>M), e.g., 1000 times, by using the magnetic head, and an OSC value is then measured. Here, the measured OSC value is referred to as a second OSC value. The second OSC value is an OSC value with the best BER when the ATW operation is performed N times.

To be more specific, in operation S113, after data is recorded on the tracks adjacent to the target track N times, e.g., 1000 times, under given OSC condition, the target track is read a predetermined number of times, e.g., 600 times to measure the BER value. The process is repeated according to varying OSC conditions, to detect the second OSC value with the optimal BER value, namely, the lowest BER value.

Next, in operation S115, an average value of the second OSC values of all the zones is compared with a criterion value "b". Here, the criterion value "b", similar to the criterion value "a", may vary according to the range of the OSC and manufacturing conditions of the HDD. For example, the criterion value "b" may be approximately half of the criterion value "a", noting that this is only an example, as the criterion values can be dependent on the values of N and M, or the change of the same, or may vary based on the characteristics of the head, disk media, and pre-amp, for example.

If the average value of the second OSC values of all the zones is greater than the criterion value "b" (b<a), it is judged that high temperature WW may occur when too low of an OSC value is used at a high temperature. Accordingly, if the average value of the second OSC values is greater than the criterion value "b," in operation S115, the magnetic head is defined as being the high temperature WW head, in operation S117. In operation S119, the high temperature WW head utilizes an OSC value greater than that of the normal head, by a predetermined level at a high temperature. In embodiments of the present invention, at the high temperature, the high temperature WW head utilizes the OSC value greater than the second OSC value, by a predetermined level "α", e.g., 2 levels.

If the average value of the second OSC values is equal to or less than the criterion value "b," in operation S115, the magnetic head is defined as being a normal head, in operation S121.

Here, it is preferable that both the normal head and the low temperature WW head utilize the second OSC value at a high temperature, and the high temperature WW head utilizes the OSC value greater than the second OSC value by the predetermined level "α".

As described above, after the ATW is performed 100 times, if the average value of the first OSC values of all the zones is greater than the criterion value "a", the magnetic head is defined as being a low temperature WW head. Also, after the ATW is performed 1000 times, if the average value of the second OSC values of all the zones is greater than the criterion value "b", the magnetic head is defined as being a high temperature WW head. In addition, if the average value of the first OSC values is equal to or less than the criterion value "a" and/or the average value of the second OSC values is equal to or less than the criterion value "b", the magnetic head is defined as being a normal head.

Once the status of the magnetic head is defined, as above in operation S123, the process goes to the next operation, for example, operation S200, including optimizing the write properties of the objective magnetic head, as described in FIG. 5, or the operation of repeating the above magnetic head definition operations with respect to a next magnetic head.

Here, for the HDD in which a plurality of magnetic heads are installed, the write property optimization is performed while the statuses of the magnetic heads are defined, or the optimization is sequentially performed on the respective magnetic heads after all the magnetic heads have been completely defined.

The optimization of the write properties of the magnetic heads may be performed in operations S109 and S119, as illustrated in FIG. 6. As detailed in FIG. 6, the optimization of the write properties of the magnetic heads may be performed in the operation of defining the magnetic head, or may be performed on the respective magnetic heads after definition of all the magnetic heads has been completed.

At a low temperature, the low temperature WW head can utilize the maximum OSC value, and the normal head and the high temperature WW head can utilize the OSC value when the ATW is 0.

At a normal temperature, all of the low temperature WW head, the normal head, and the high temperature WW head can utilize the first OSC value.

Furthermore, at a high temperature, the low temperature WW head and the normal head can utilize the second OSC value, and the high temperature WW head can utilize the OSC value greater than the second OSC value by the predetermined level "α".

The WC affects the writability properties less than the OSC. At a normal temperature, all of the normal head, the low temperature WW head, and the high temperature WW head can utilize the first OSC, and the WC measured with the optimal BER value, when the ATW is 0.

At a low temperature, the magnetic head defined as the low temperature WW head can utilize the WC value greater than that of the normal head. At a low temperature, the high temperature WW head and the normal head can utilize the WC less than that of the low temperature WW head, and can utilize the WC measured with the optimal BER value when the ATW is 0.

At a high temperature, the normal head and the low temperature WW head can utilize the WC, less than the WC measured with the optimal BER, when the ATW is 0, and the high temperature WW head can utilize the WC measured with the optimal BER, when the ATW is 0.

In the HDD, the optimal OSC and WC, which are used for optimizing the write properties of the magnetic heads, are stored in a memory (not shown) of the electronic circuit. Whenever read/write operations of the HDD are performed, the respective magnetic heads perform optimal write functions using the OSC and WC values stored in the memory.

According to the present invention, after the ATW test has been performed, the magnetic head can be defined as the normal head, the low temperature WW head, or the high temperature WW head according to the set OSC value, and the optimal OSC and WC can be used for the potential WW head, thereby improving writability.

When the magnetic head defined as the low temperature WW head utilizes the OSC and WC greater than those of the normal head, under low temperature conditions, writability and overwrite properties can be improved.

In the meantime, the magnetic head defined as the high temperature WW head can utilize the OSC and WC greater than those of the normal head, under high temperature conditions, in order to solve high temperature WW problems caused when the OSC and WC are excessively reduced at a high temperature.

According to embodiments of the present invention, the operations of defining the magnetic head in the HDD as a normal head, a high temperature WW head, or a low temperature WW head, and correspondingly optimizing the write properties using the optimal OSC and WC, can be repeated for as many times as the number of the magnetic heads.

Since the plurality of magnetic heads, corresponding to the surfaces of the hard disks, are provided within the HDD, the operation of optimizing the write properties of the magnetic heads among the HDD drive process can be repeated until it has been performed on all the magnetic heads in the HDD.

Moreover, the above operations may be performed on one magnetic head or selectively some magnetic heads as needed.

Data of respective magnetic heads, defined as the normal head, the low temperature WW head or the high temperature WW head, can be stored in the memory of the electronic circuit of the HDD. In practical user conditions, since the optimal OSC and WC for guaranteeing the write performance of the magnetic head are used in consideration of the environmental temperature and whether the respective magnetic head is the normal head, the low temperature WW head, or the high temperature WW head, the present invention can ensure superior writabilty.

According to embodiments of the present invention described above, the magnetic head within the HDD can be defined as the normal head, the low temperature WW head, or the high temperature WW head, and the OSC and WC, optimized according to the property of each magnetic head, can be used in consideration of the writability according to the status of the magnetic head and the environmental temperature, low and high temperature WW problems can be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of optimizing write properties of a magnetic head capable of performing read/write functions on a medium, the method comprising:
   categorizing the magnetic head into categories of at least a defined normal head, a defined low temperature weak write head, and a defined high temperature weak write head and storing a result of the categorizing, during a first optimization operation; and
   optimizing the write properties of the magnetic head using optimal over shoot control and write current according to the stored result of the categorizing of the magnetic head and an optimization respective environmental temperature, in a second optimization operation temporally different from the first optimization operation.

2. The method of claim 1,
   wherein the operation of optimizing the write properties is performed at a high temperature such that the defined high temperature weak write head utilizes an over shoot control and write current which are greater than an overshoot and write current used for the defined normal head.

3. The method of claim 1,
   wherein the operation of optimizing the write properties is performed at a low temperature such that the defined low temperature weak write head utilizes an over shoot control and write current which are greater than an overshoot and write current used for the defined normal head.

4. The method of claim 1, wherein the operation of optimizing the write properties is performed on one magnetic head, selectively on magnetic heads among a plurality of magnetic heads included in a hard disk drive, or performed on all magnetic heads of the hard disk drive.

5. A hard disk drive, comprising:
   a disk for storing information;
   a head assembly comprising a head to control addition and/or deletion of information to/from the disk; and
   an actuator assembly to rotate the head assembly,
   wherein write properties for controlling the writing of information to the disk, as performed by the head, are optimized according to the method of claim 1.

6. A method of optimizing write properties of a magnetic head capable of performing read/write functions on a medium, the method comprising:
   defining the magnetic head as a defined normal head, a defined low temperature weak write head, or a defined high temperature weak write head; and
   optimizing the write properties of the magnetic head using optimal over shoot control and write current according to the defined status of the magnetic head and an environmental temperature,
   wherein the operation of defining the magnetic head comprises:
   performing an adjacent track write operation "M" number of times on a plurality of zones of a track adjacent to a target track of the medium, and measuring a first over shoot control with an optimal bit error rate on the target track, and
   comparing an average value of multiple first over shoot controls of the plurality of zones with a first criterion value, and judging whether the magnetic head corresponds to a low temperature weak write head; and/or
   performing the adjacent track write operation "N" number of times, where "N" is greater than "M", on the plurality of zones of the track adjacent to the target track of the medium, and measuring a second over shoot control with an optimal bit error rate on the target track, and
   comparing an average value of multiple second over shoot controls of the plurality of zones with a second criterion value, and judging whether the magnetic head corresponds to a high temperature weak write head.

7. The method of claim 6, wherein the operation of judging whether the magnetic head corresponds to the low temperature weak write head comprises judging that the magnetic head corresponds to the low temperature weak write head when the average value of the multiple first over shoot controls is greater than the first criterion value, and judging that the magnetic head corresponds to a normal head when the average value of the multiple first over shoot controls is equal to or less than the first criterion value.

8. The method of claim 7, wherein the first criterion value is greater than the second criterion value.

9. The method of claim 6, wherein the operation of judging whether the magnetic head corresponds to the high temperature weak write head comprises judging that the magnetic head corresponds to the high temperature weak write head when the average value of the multiple second over shoot controls is greater than the second criterion value, and judging that the magnetic head corresponds to a normal head when the average value of the multiple second over shoot controls is equal to or less than the second criterion value.

10. The method of claim 9, wherein the first criterion value is greater than the second criterion value.

11. The method of claim 6, wherein the number "N" is greater than the number "M".

12. The method of claim 6, wherein the adjacent track write operation is performed in all zones of both adjacent tracks, adjacent to the target track, and both of the average values of the multiple first and second over shoot controls are average values for all the zones.

13. The method of claim 6, wherein the first criterion value is greater than the second criterion value.

14. The method of claim 6, wherein the operation of optimizing the write properties is performed at a normal temperature such that the defined high temperature weak write head, the defined low temperature weak write head, and the defined normal head utilize the first over shoot control, and/or utilize a write current measured with an optimal bit error rate in a state where the adjacent track write operation has not been performed.

15. The method of claim 6, wherein the operation of optimizing the write properties is performed at a low temperature such that the defined low temperature weak write head utilizes a maximum over shoot control, and the defined normal head and the defined high temperature weak write head utilize an over shoot control with an optimal bit error rate in a state where the adjacent track write operation has not been performed, and/or the defined low temperature weak write head utilizes a write current, which is greater than a write current used by the defined normal head, and the defined high temperature weak write head and the defined normal head utilize a write current, which is less than a write current used by the defined low temperature weak write head.

16. The method of claim 6, wherein the operation of optimizing the write properties is performed at a high temperature such that the defined high temperature weak write head utilizes an over shoot control greater than the second over shoot control by a predetermined level "α", and the defined low temperature weak write head and the defined normal head utilize the second over shoot control, and/or the defined normal head and the defined low temperature weak write head utilize a write current, which is less than a write current with the optimal bit error rate in a state where the adjacent track write operation has not been performed, and the defined high temperature weak write head utilizes the write current with the optimal bit error rate in the state where the adjacent write track operation has not been performed.

17. The method of claim 6, wherein the operation of optimizing the write properties is performed on one magnetic head, selectively on magnetic heads among a plurality of magnetic heads included in a hard disk drive, or performed on all magnetic heads of the hard disk drive.

18. A method of defining a magnetic head as a defined normal head, a defined low temperature weak write head, or a defined high temperature weak write head, the method comprising:
performing an adjacent track write operation "M" number of times on a plurality of zones of a track adjacent to a target track of a medium, and measuring a first over shoot control with an optimal bit rate on the target track, and
comparing an average value of multiple first over shoot controls of the plurality of zones with a first criterion value, and judging whether the magnetic head corresponds to a low temperature weak write head; and/or
performing the adjacent track write operation "N" number of times, where "N" is greater than "M", on the plurality of zones of the track adjacent to the target track of the medium, and measuring a second over shoot control with an optimal bit rate on the target track;
comparing an average value of multiple second over shoot controls of the plurality of zones with a second criterion, and judging whether the magnetic head corresponds to a high temperature weak write head.

19. The method of claim 18, wherein the operation of judging whether the magnetic head corresponds to the low temperature weak write head comprises judging that the magnetic head corresponds to the low temperature weak write head when the average value of the multiple first over shoot controls is greater than the first criterion value, and judging that the magnetic head corresponds to a normal head when the average value of the multiple first over shoot controls is equal to or less than the second criterion value.

20. The method of claim 18, wherein the operation of judging whether the magnetic head corresponds to the high temperature weak write head comprises judging that the magnetic head corresponds to the high temperature weak write head when the average value of the multiple second over shoot controls is greater than the second criterion value, and judging that the magnetic head corresponds to a normal head when the average value of the multiple second over shoot controls is equal to or less than the second criterion value.

21. The method of claim 18, wherein the number "N" is greater than the number "M".

22. A hard disk drive, comprising:
a disk for storing information;
a head assembly comprising a head to control addition and/or deletion of information to/from the disk; and
an actuator assembly to rotate the head assembly,
wherein the head is controlled and data written to the disk according to a defining of the head as a defined normal head, a defined low temperature weak write head, or a defined high temperature weak write head, according to the method of claim 21.

23. The method of claim 18, wherein the adjacent track write operation is performed on all zones of both tracks adjacent to the target track, and both the average values of the multiple first and second over shoot controls are average values for all of the zones.

24. The method of claim 18, wherein the first criterion value is greater than the second criterion value.

25. The method of claim 18, wherein the definition the magnetic head is performed on one magnetic head, selectively on some magnetic heads among a plurality of magnetic heads included in a hard disk drive, or is performed on all magnetic heads of the hard disk drive.

26. A method of operating a drive, with optimized write properties of multiple heads of the drive being capable of performing read/write functions on a medium of the drive, the method comprising:
categorizing a head status of each head, with each head being categorized into categories of at least a defined normal head, a defined low temperature head, and a defined high temperature head and storing a result of the categorizing, during a first optimization operation; and
optimizing the write properties of the multiple heads using the stored result of the categorizing of the multiple heads and an optimization respective environmental temperature, in a second optimization operation temporally different from the first optimization operation; and
writing information to the medium based on the optimized write properties and the stored result of a corresponding categorizing of a corresponding head, categorized as at least one of the defined normal head, the defined low temperature head, and the defined high temperature head.

27. The method of claim 26, wherein when a drive environmental temperature is high write properties for the defined normal head and defined low temperature head are different from write properties of the defined high temperature head, when the drive environmental temperature is low write properties of the defined normal head and defined high temperature head are different from write properties of the defined low temperature head, and when the drive temperature is normal the drive properties for the defined normal head, the defined high temperature head, and the defined low temperature head are the same.

28. A hard disk drive, comprising:
a disk for storing information;
a head assembly comprising a head to control addition and/or deletion of information to/from the disk; and
an actuator assembly to rotate the head assembly,
wherein the head is controlled and data written to the disk according to a categorizing of the head into categories of at least a defined normal head, a defined low temperature weak write head, and a defined high temperature weak write head, according to the method of claim 26.

29. A method of operating a drive, the method comprising:
defining the magnetic head, with magnetic head definitions comprising a defined normal head, a defined low temperature weak write head, or a defined high temperature weak write head, based on an obtained over-shoot control (OSC) value at a low temperature, by performing an adjacent track write (ATW) operation M times, and an obtained another OSC value at a high temperature, by performing another ATW operation N times, with M<N;

optimizing the write properties of the magnetic head according to the defined status of the magnetic head and an environmental temperature; and performing read and/or write operations from/to a medium storing data in the drive.

30. A drive, comprising:
a medium for storing information;
a head assembly comprising a head to control addition and/or deletion of information to/from the medium; and
wherein read and/or write operations from/to the medium are performed according to the method of claim 29.

* * * * *